Figure 1:
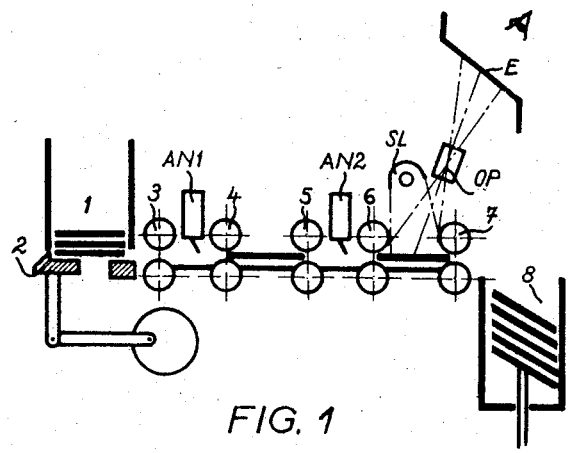

June 23, 1959  P. J. C. CHENUS  2,891,721
MACHINES FOR COMPARING AND VERIFYING RECORDS
Filed July 24, 1956  2 Sheets-Sheet 1

June 23, 1959  P. J. C. CHENUS  2,891,721
MACHINES FOR COMPARING AND VERIFYING RECORDS
Filed July 24, 1956  2 Sheets-Sheet 2
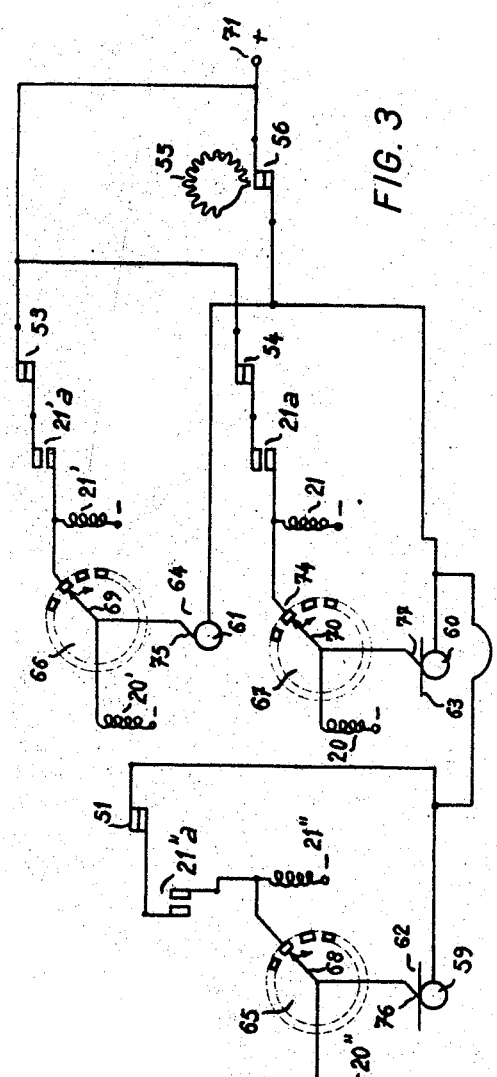
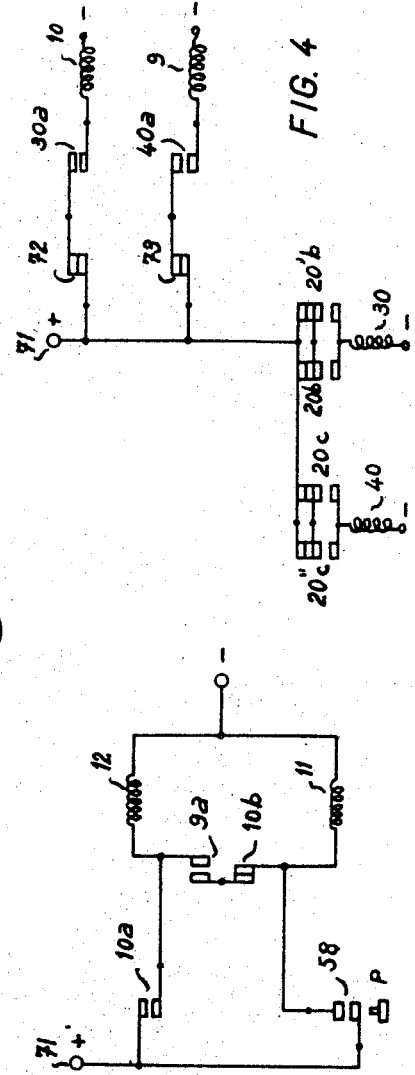

United States Patent Office 2,891,721
Patented June 23, 1959

2,891,721

MACHINES FOR COMPARING AND VERIFYING RECORDS

Pierre Jacques Charles Chenus, Paris, France, assignor to Compagnie des Machines Bull (Societe Anonyme), Paris, France Application July 24, 1956, Serial No. 599,757

Claims priority, application France August 3, 1955

7 Claims. (Cl. 235—61.7)

This invention relates to a machine for comparing records carried by one or more record carriers and records carried by one or more other record carriers. Furthermore, an object of the invention is to provide a machine for comparing the account number indicated by a record carrier and the account number indicated by another record carrier, and in the event of equality of said two numbers, for permitting visual verification of various other data of said two record carriers.

According to the invention, such verification could comprise the visual verification of the identity of two signatures, two addresses and the identity of account numbers or other data recorded on the documents compared.

Another object of the invention is to provide a machine for checking the signature of the debtor of a post office money order or post office cheque, for verifying the identity of the name and account of the creditor of a post office money order or post office cheque, and for verifying that the account number of the beneficiary indicated on an order or cheque actually corresponds with the name of the beneficiary indicated on said order or cheque.

Other comparisons between the data carried by the documents compared may be effected automatically and independently of the visual comparison.

A machine constructed in accordance with the invention comprises substantially a first track or document feed device, on which the documents to be verified are fed automatically and read by one or more reading devices, a second track on which the verification documents are fed, read and compared automatically, and arrangements for permitting visual comparison of data recorded on the documents fed on the two tracks.

Other objects of the invention will appear from the following description and the accompanying drawings, which show diagrammatically and by way of simple example a machine in which the documents to be compared are fed along two separate tracks, in which they are moved selectively according to the results of comparisons effected between the sorting indications, which are taken automatically from said documents. These indications may be carried by said documents in the form of perforations, marks or signs adapted to be analysed by appropriate exploring means, as used for example in automatic accounting or statistical machines.

The magazines for the documents to be verified, the verification documents and the verified documents, the members for feeding said documents in the machine, the means for analysing the sorting indications or the indications to be compared automatically, the storage and comparing means of the analysed data, and other devices used in the machine may be, for example, of the type described in United States Patent No. 2,623,592, filed by K. A. Knutsen on October 8, 1948, for a machine for the reproduction of record cards, and in United States Patent No. 2,610,736 filed by K. A. Knutsen on December 17, 1946, for a machine for comparing and classifying record cards. Of course, these devices may, in practice, be replaced by any equivalent devices permitting the same results to be obtained.

Figure 2:
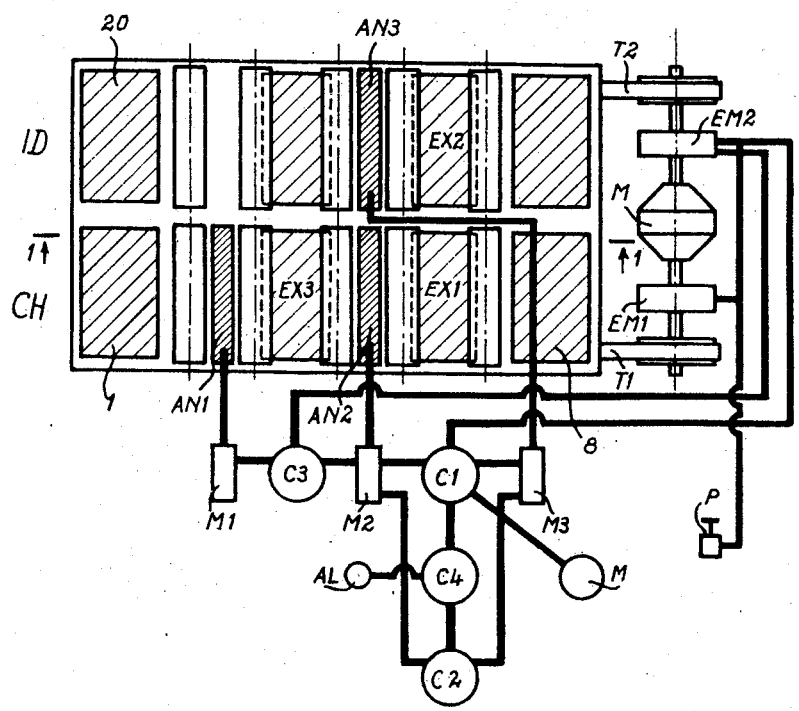

Figure 1 of the accompanying drawings shows diagrammatically a longitudinal sectional view on the line 1—1 of Figure 2, and Figure 2 represents diagrammatically a plan of the machine and the principal control connections between different members of the machine. Figures 3, 4, 5 represent an electrical circuit diagram showing the various circuits required to control the movements of the records on the tracks.

In the drawing of Figure 1, the cheques or documents to be verified are placed in a magazine 1 from which they are removed one by one by a blade mechanism 2. Sets of rollers 3, 4, 5, 6 and 7 cause the documents to advance along the track and to pass successively below analysis devices AN1 and AN2. The verified documents are then deposited in the reception box 8.

The feed members for the documents travelling on the track CH are driven by a motor M through the medium of a clutch EM1 and a mechanical transmission T1, shown only in part.

The members for feeding the documents along the track ID are driven by the motor M through the medium of a clutch EM2 and a mechanical transmission T2. These clutches may be engaged by means of a starting button P, but may also be maintained engaged or disengaged under the control of the indications furnished by comparison devices C1, C3 or C4.

In the example described, the track ID comprises only one analysis device AN3. The analysis devices AN1, AN2 and AN3 are each connected respectively to data storage devices M1, M2, M3, each connected to comparison devices C1, C2, C3, which ensure automatic comparison of the data analysed in the documents, either during the passage of the documents under the analysis devices, or after the passage of said documents under said analysis devices. The two tracks are provided with appropriate means for visual examination of certain parts of the documents stopped in the positions EX1 and EX2 of the two tracks. In these positions, the documents are illuminated by light sources SL and only the image of the parts to be examined and compared visually is projected on to a translucent screen E by means of an appropriate optical device OP comprising suitably arranged diaphragms.

Examination of the documents may also be made directly without optical device.

Arrangements are provided for permitting the removal and if necessary the replacement of the documents arrested in the positions EX1 and EX2.

In the example described, the machine is used for verifying by visual comparison the authenticity of signatures carried by the documents travelling on the track CH with regard to witness signatures carried by the verification documents travelling on the track ID. It will be likewise possible to verify visually whether the addresses written on the documents compared correspond to the recorded account numbers. It will also be possible to make this latter verification automatically, if the addresses are written, by means of, or are accompanied by, signs adapted to be analysed by automatic analysis means.

The verification documents carrying the reference indications are placed in the magazine 20 of the track ID, and the documents carrying the indications to be verified are placed, as already stated, in the magazine 1 of the track CH. All these documents carry numerical indices (account numbers) and possibly alphabetic or alpha-numerical indices (addresses), adapted to be analysed by the analysis means provided on the tracks. The documents will have been previously sorted in a predetermined increasing (or decreasing) order of sorting indices to be compared automatically in the machine.

Sequence control devices may be associated with the machine for verifying, during operation, the correct order of succession of the order numbers of the documents fed through the machine.

The machine being in running order, the button P is pushed. The clutches EM1 and EM2 are engaged and the transmissions T1 and T2 actuate the devices feeding the documents along the two tracks.

When a document to be verified arrives at the position EX1 of the track CH, feeding of the documents along this track is stopped. The analysis devices AN1 and AN2 have each introduced into the corresponding data store M1 and M2 the sorting indication of the last document analysed.

At the same time that a document to be verified is brought to and stopped in position EX1, a verification document is brought to EX2. The indication of this latter document has been analysed by AN3 and introduced into the corresponding store M3. If the comparison C1 established between M2 and M3 gives equality, the clutch EM2 is automatically stopped. The documents stopped in EX1 and EX2 have therefore the same sorting indication and may be compared visually.

The optical examination device SL, OP, E shown in Figure 1 makes it possible to verify for example by visual comparison the agreement between the signatures carried on the one hand by the document to be verified stopped in EX1, and on the other, by the verification document stopped in EX2.

As previously stated, it is possible to verify by visual comparison the agreement or a predetermined relationship between the data carried by said documents. It has been assumed that the first verification document fed along the track ID corresponded to the first document to be verified fed along the track CH. It may also happen that the first verification document fed is not the document corresponding to the document to be verified. In this case, the verification documents only will continue to be fed under the control of the comparison C1 until this comparison gives "identity." The visual control operation having been accomplished, it is merely necessary to push button P in order to pass to the next documents and so forth. It also happens that several documents to be verified, fed along the track CH, carry the same indications and consequently follow each other. In this case, the comparison C3 established between M1 and M2 verifies "equality" and prevents the engagement of the clutch EM2 when the button P is pushed. Due to this, the verification document stopped at EX2 will remain in place as long as the indication of the documents to be verified, fed successively under the analysis devices AN1 of the track CH, does not change. When the indications recorded respectively in M1 and M2 are "different," pressure on the button P now causes the advance of the document stopped at EX1 and the document stopped at EX2. The Figures 3, 4, 5 represent an electrical circuit diagram showing the various circuits required to control the movements of the records on the tracks. It is assumed as an example that the cheques and the verification documents are provided with holes established as in the well known punched record cards, said holes representing in a coded form an account number. These holes are sensed by brushes as in the known tabulating machines.

The motor M of the Figure 2 rotates continuously and a revolution of the shaft of said motor corresponds to a cycle of the machine. The clutch EM1 is controlled by a magnet with an energization winding 11 and the clutch EM2 is controlled by a magnet with an energization winding 12 (Figure 5). The clutches EM1 and EM2 are arranged so that, if an energization winding is energized during any point of a cycle, the shaft of said clutch is moved in the beginning of the following cycle and effects a complete revolution. (One revolution clutch.)

On Figure 3 are shown three commutator units 65, 66, 67 provided with arms 68, 69, 70 revolving in synchonism with the movement of the shaft of the motor M and making successive contacts with equidistant studs as shown in 74, the number of which for each commutator being equal to the number of points of each cycle of the machine (only some of these studs being shown). Further said figure shows three brushes 75, 77, 76 corresponding each respectively to the analyzing devices AN3, AN2, AN1, and three corresponding contact rollers 61, 60, 59 connected to the positive terminal 71 of a feeding voltage (the negative terminals of said feeding voltage are indicated by the sign —). Said figure shows also three relays 20, 20', 20", three holding relays 21, 21', 21", contacts 51, 53, 54 controlled by cams (not shown), a pulse generator 55 connected to the terminal 71. It will be understood that each stud as 74 is connected to a relay as 21, a contact as 21a, a contact as 54. In order to simplify the figures, each commutator unit has been shown with a single holding relay. The contact 53 is controlled by a cam (not shown) fastened on the shaft which actuates the transmission T2 of Figure 2, this contact being temporarily opened at the beginning of the revolution of said shaft. In the same way the contacts 51 and 54 are controlled by cams (not shown) fastened on the shaft which actuates the transmission T1 of Figure 2, these contacts being temporarily opened at the beginning of the revolution of said shaft.

It has been assumed, in order to simplify, that for each track there is a single comparison position and a single sensing device for the records. If several comparison positions and several sensing devices are necessary, for instance 7 comparison positions and 7 sensing devices for sensing 7 columns of the records, it would be provided 7 commutator units as 65, 7 commutator units as 66 and so one, 7 brushes as 75, 7 brushes as 76, etc., and also 7 relays as 20 wired in parallel and so on. But the results of the working of the machine should remain absolutely the same.

Figure 4 shows contacts of relays 20, 20', 20", relays 30, 40 and their contacts, comparison relays 9 and 10, contacts 72 and 73 controlled by cams (not shown) fastened on the shaft of the motor and temporarily opened at the end of each cycle.

Figure 5 shows the starting button P, the contact 58 which is adapted to be closed by a depression on said button P and which is connected to the terminal 71 and to the energization windings 11 and 12 of the clutches EM1 and EM2 through contacts of the comparison relays 9 and 10.

The operation of said circuits shown on Figures 3, 4, 5 is now described. A depression on the starting button P energizes the windings 11 and 12 (Figure 5) by the circuit terminal 71, contact 58 closed, winding 11, negative terminal and by the circuit terminal 71, contact 58 closed, contact 10b closed, contact 9a closed, winding 12, negative terminal. The contact 9a is closed because the relay 9 is energized. The energization of the windings 11 and 12 operates the clutches EM1 and EM2 as already described and advances a cheque and a verification document, each on a track. After three successive depressions on the button P, the first cheque reaches the position EX1 and the first verification document the position EX2. If the account numbers of said documents are identical, the comparison device C1 indicates equality, that is the relays 20 and 20' (Figure 3) are energized simultaneously, the contacts 20b and 20'b (Figure 4) are then simultaneously displaced from their rest position, so that the relay 30 is non energized, the contact 30a remains open, the relay 10 is not energized, the contact 10a remains open and the contact 10b remains closed. Therefore the windings 11 and 12 are not energized and the documents to be compared are stopped in the positions EX1 and EX2. If now the comparison between the first and second cheques on the track CH, effectuated by the device C3, indicates inequality, a further pressure on the button P causes the energization of the windings 11 and 12 and the operation of the clutches EM1 and EM2 because of the non simultaneous energization of the relays 20 and 20″, the energization of the relay 40, the closing of the contact 40a, the energization of the relay 9, and the closing of the contact 9a. On the contrary, if the comparison device C3 gives equality, the relay 9 is non energized, the winding 11 is energized and the winding 12 non energized, causing the movement on the track CH of the cheques and the retaining in stopped position of the documents on the track ID (Figure 2). After each new depression on the button P, if the comparison device C3 gives equality (it is assumed that the comparison device C1 gives equality), the winding 11 is still energized and the winding 12 is still non energized, causing the movement on the track CH of the cheques. When the comparison device C3 will give inequality, a new depression on the button P will energize the windings 11 and 12, causing the movements of the two tracks CH and CD. In this case new records are carried through the analyzing devices AN2 and AN3 (Figure 2). Now if the corresponding account numbers are not identical, the comparing device C1 gives inequality, the relays 20 and 20′ are not simultaneously energized, the relay 30 is not energized, the contact 30a (Figure 4) is closed, the relay 10 (Figure 4) is energized, the contact 10a (Figure 5) is closed and the contact 10b is opened so that the winding 12 is energized and the clutch EM2 operated, the comparing device C3 giving equality or inequality. Indeed in this case the energization of the winding 12 and the non energization of the winding 11 are independent of the position of the contact 9a. Therefore the track CH is stopped whereas the track ID is moved. The same circuit operates during the following cycles so long as the comparing device C1 gives inequality. Indeed the relay 20 (Figure 3) is always energized during the same point of said cycles by the holding circuit: terminal 71, contact 54 closed, contact 21a closed, stud 74, arm 70. When the comparing device C1 gives equality, the relay 10 (Figure 4) is not energized and then the winding 12 is not energized. The records are then stopped on the positions EX1 and EX2.

It will be advantageous for the comparison between M2 and M3, instead of indicating only "equal" or "different," to be adapted for indicating more exactly: "larger," "equal" or "smaller." This makes it possible to signal documents to be verified for which there is no corresponding verification document. In these conditions, as long as the comparison C1 indicates M3 "smaller" than M2, a corresponding verification document not yet having reached the visual verification position, the following documents are fed along the track ID, and, when the comparison C1 indicates M3 "larger" than M2, it means that the verification document, which would have given "equality" with the document to be verified, is missing or is not in its place in the series. A special signal M is released and warns the operator of the kind of error found and stops the machine. This arrangement thus ensures a sequence control of the documents fed along the two tracks.

Comparison devices C2 and C4 are provided for permitting also the automatic comparison of analysable recorded data, other that the sorting indications or account numbers which control the automatic feeding of the documents through the machine. Thus, when the addresses or other data are recorded in a manner analysable by the analysis means of the machine, it is possible to vertify their agreement automatically according to the account numbers analysed. If these numbers have been used for sorting, the comparison device C1 compares on the one hand the account numbers introduced into a part of the stores M2 and M3, and the comparison device C2, on the other hand, compares the addresses or other data introduced into another part of the same stores. The comparator C4, provided between C1 and C2, verifies whether the indications furnished by C1 and by C2 are identical. C1 and C2 may both indicate "different" or both indicate "equality." In both cases, C4 verifies the "equality" of the indications furnished by C1 and C2, but if C1 indicates "equality" of the account numbers, and C2 indicates "different" for the addresses compared, C4 finds a "difference" between the indications furnished by C1 and the indications furnished by C2 and releases a signal AL, indicating to the operator that the data "addresses" carried by the documents and compared automatically do not agree.

It is obvious that the example described is by no means restrictive, and that for example it could be possible to provide a machine in which the reference documents would be recorded on a continuous band advanced and examined according to the principles set forth hereinbefore and that all modifications and adaptations could be made in the machine according to the cases and applications without departing from the spirit of the invention.

I claim:

1. In a machine for comparing and verifying records, the combination of a motor driven shaft, a first track comprising first feeding means, a first analysing device, a first clutch for connecting, when operated, said first feeding means to said motor driven shaft for feeding the records to be verified and to stop them with a record in a determined position on said first track, a second track comprising second feeding means, a second analysing device, a second clutch for connecting, when operated, said second feeding means to said motor driven shaft for feeding the verification records carrying the reference indications with which the indications of the records to be verified are to be compared and to stop them with a record in a determined position on said second track, each of said analysing devices being adapted to analyse data on records fed on the corresponding track, first and second data storage devices connected respectively to each of said first and second analysing devices and adapted to store the data analysed on a record by the connected analysing device, a comparing device connected to both said data storage devices and to both said analyzing devices and adapted to compare data stored in said storage devices or to compare data stored in one of said storage devices with data analysed on records by the analysing device connected to the other of said storage devices, said tracks being adapted to permit a visual examination of certain indications on records stopped in said determined positions and a manual operable starting device connected to said clutches and to said comparing device and adapted to control, when operated, said clutches differently according to the result of the comparison of two records by said comparing device in order to feed records simultaneously on each of said tracks when the data compared by said comparing device are identical or only on said second track when the data compared by said comparing device are different.

2. In combination with the machine set forth in claim 1, a further analysing device on said first track, a further data storage device connected to said further analysing device and adapted to store data analysed on a record by said further analysing device, and a further comparing device connected to said further storage device and to said first storage device, said further comparing device being adapted to compare the data on two records fed successively on said first track and to prevent said second clutch being operated from said starting device when the compared data are equal.

3. In combination with the machine set forth in claim 1, a further analysing device on said first track, a further comparing device connected to said first and to said further analysing device and adapted to compare the data on two records fed successively on said first track and to prevent said second clutch being operated from said starting device when the compared data are equal.

4. In combination with the machine set forth in claim 1, a light source for illuminating records stopped in said determined positions, a translucent screen and an optical device adapted to project simultaneously on to said screen the image of those parts of said stopped records which are to be visually compared.

5. A machine as set forth in claim 1, in which the verification records fed on said second track form parts of a continuous band fed by said second feeding means.

6. In a machine for comparing and verifying records, the combination of a motor driven shaft, a first track comprising first feeding means, a first analyzing device, a first clutch for connecting, when operated, said first feeding means to said motor driven shaft for feeding the records to be verified and to stop them with a record in a determined position on said first track, a second track comprising second feeding means, a second analyzing device, a second clutch for connecting, when operated, said second feeding means to said motor driven shaft for feeding the verification records carrying the reference indications with which the indications of the records to be verified are to be compared and to stop them with a record in a determined position on said second track, each of said analyzing devices being adapted to analyze data on records fed on the corresponding track, first and second data storage devices connected respectively to each of said first and second analyzing devices and adapted to store the data analyzed on a record by the connected analyzing device, magnets, each for controlling one of said clutches, a comparison relay, a comparing device connected to said data storage devices and to said analyzing devices and adapted to compare data analyzed by said analyzing devices or stored in said storage devices or adapted to compare data stored in one of said storage devices with data analyzed on records by the analyzing device connected to the other of said storage devices so that said comparison relay is energized when said compared data are different and non energized when said compared data are identical, a manual operated electric starting device connected to a voltage source and to said magnets through contacts of said comparison relay, adapted to energize, when operated, said magnets when said comparison relay is non energized and adapted to energize only the magnet for said second clutch when said comparison relay is energized, said tracks being adapted to permit a visual examination of certain indications on record stopped in said determined positions.

7. In a machine for comparing and verifying records, the combination of a motor driven shaft, a first track comprising first feeding means, a first and a second analyzing device, a first clutch for connecting, when operated, said first feeding means to said motor driven shaft for feeding the records to be verified and to stop them with a record in a determined position on said first track, a second track comprising second feeding means, a third analyzing device, a second clutch for connecting, when operated, said second feeding means to said motor driven shaft for feeding the verification records carrying the reference indications with which the indications of the records to be verified are to be compared and to stop them with a record in a determined position on said second track, each of said analyzing devices being adapted to analyze data on records fed on the corresponding track, first, second and third data storage devices connected respectively to each of said first, second and third analyzing devices and adapted to store the data analyzed on a record by the connected analyzing device, magnets, each for controlling one of said clutches, a first comparison relay, a first comparing device connected to said second and third storage devices and to said second and third analyzing devices and adapted to compare data analyzed by said second and third analyzing devices or stored by said second and third storage devices or adapted to compare data stored in one of said storage devices with data analyzed on records by the analyzing device connected to the other of said storage devices, so that said comparison relay is energized when said compared data are different and non energized when said compared data are identical, a second comparison relay, a second comparing device connected to said first and second storage devices and to said first and second analyzing devices and adapted to compare data analyzed by said first and second analyzing devices or stored by said first and second storage devices or adapted to compare data stored in one of said storage devices with data analyzed on records by the analyzing device connected to the other of said storage devices, so that said second comparison relay is energized when said compared data are different and non energized when said compared data are identical, a manual operated electric starting device connected to a voltage source and to said magnets through contacts of said comparison relays and adapted to energize, when operated, said magnets when said first comparison relay is non energized and said second comparison relay is energized and adapted to energize only said magnet for said first clutch when said comparison relays are non energized and only said magnet for said second clutch when said first comparison relay is energized, said tracks being adapted to permit a visual examination of certain indications on record stopped in said determined positions.

References Cited in the file of this patent

UNITED STATES PATENTS

| | | |
|---|---|---|
| 2,124,906 | Bryce | July 26, 1938 |
| 2,315,741 | Shafer | Apr. 6, 1943 |
| 2,482,242 | Brustman | Sept. 20, 1949 |
| 2,700,756 | Estrems | Jan. 25, 1955 |
| 2,702,380 | Brustman et al. | Feb. 15, 1955 |